Figure 1:
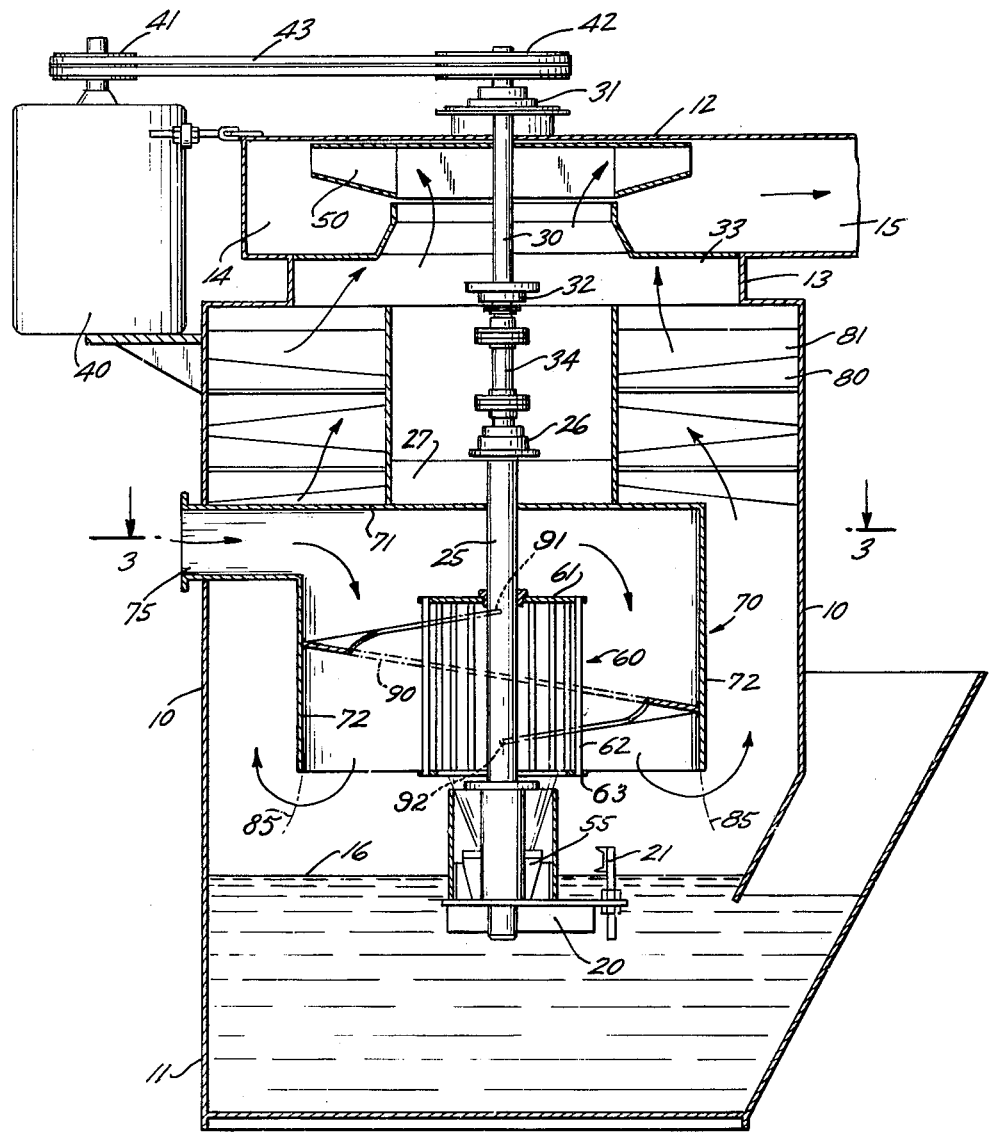

Sept. 22, 1964  R. M. JAMISON ETAL  3,149,935
METHOD AND APPARATUS FOR GAS WASHING WITH LIQUID SPRAY
Filed May 25, 1961  2 Sheets-Sheet 1

INVENTORS
ORLAN M. ARNOLD
ROBERT M. JAMISON
BY
Curtis, Morris & Safford
ATTORNEYS Sept. 22, 1964 R. M. JAMISON ETAL 3,149,935
METHOD AND APPARATUS FOR GAS WASHING WITH LIQUID SPRAY
Filed May 25, 1961 2 Sheets-Sheet 2
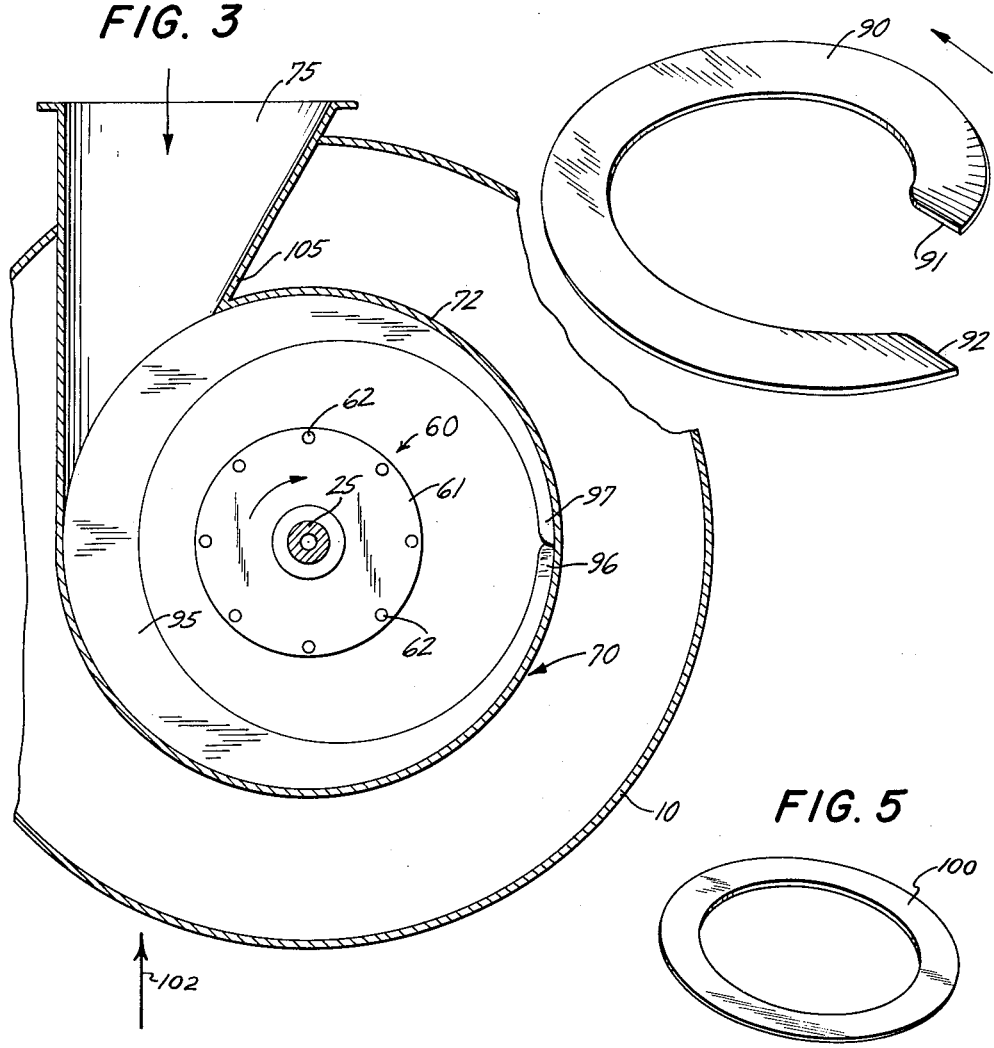
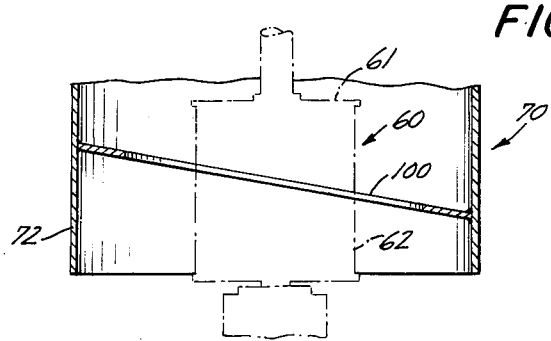
INVENTORS
ORLAN M. ARNOLD
ROBERT M. JAMISON
BY
Curtis, Morris & Safford
ATTORNEYS

United States Patent Office

3,149,935
Patented Sept. 22, 1964

3,149,935
METHOD AND APPARATUS FOR GAS WASHING WITH LIQUID SPRAY
Robert M. Jamison, Detroit, and Orlan M. Arnold, Grosse Pointe Park, Mich., assignors to Ajem Laboratories, Inc., Livonia, Mich.
Filed May 25, 1961, Ser. No. 112,629
11 Claims. (Cl. 55—84)

This invention relates to method and apparatus for washing of gases with liquid spray droplets forcibly driven across the path of the gas stream through washing, and, more particularly, to such gas washing wherein the gas stream passes downwardly through the spray of droplets in a washing chamber from a gas inlet positioned above the washing spray.

Apparatus of generally the character to which this invention relates may be typified or illustrated by that disclosed in the copending application of Jamison and Umbricht, Ser. No. 112,654, filed May 25, 1961, executed and filed of even date herewith. As illustrated therein, a high velocity washing liquid spray is produced in a washing chamber by a rotating cage distributor which flings the washing spray outwardly across the chamber. Air or other gas to be washed is introduced through a tangential inlet at the top of the washing chamber and above the washing liquid spray, and passes downwardly through the spray with a swirling motion for the washing from the gas stream of various entrained liquid or solid or gaseous pollutants therein.

Although such constructions exhibit enhanced efficiency in gas washing as compared with prior or conventional devices, certain installations or applications of such gas washing systems have been found, particularly with certain types of entrained matter and/or in larger size devices, where the advantages of such tangential-inlet downdraft arrangements may be further enhanced as to efficiency of removal of entrained or dispersed matter and/or as to the self-cleaning functions of the device. Thus, in some particular installations it may be found that entrained dust or dirt particles tend to deposit or accumulate on upper walls or top of the washing chamber after prolonged use of the apparatus. As the soil laden air or gas enters the tangential inlet, the entrained matter therein is traveling at a rather high rate of speed and is given a swirling motion, and impingement of the soil particles one with the other or with the inner walls of the washing chamber may cause a buildup or accumulation of soil particularly in those upper areas of the washing chamber walls or top which are not directly or forcibly contacted by the washing liquid. Such accumulations may be aggravated by splashing of the washing liquid sufficient to dampen or make sticky entrained soil particles but insufficient to flush down the upper portion of the chamber walls.

If it is attemped to alleviate such condition as by providing auxiliary liquid sprays in the upper affected area of the washing chamber, certain economical or practical disadvantages may be encountered with regard to auxiliary pumping equipment for operating such sprays independently of the principal rotating spray, extra piping to a special source of liquid, possible dilution of detergents or other reagents in the principal washing liquid reservoir, etc. Also, particularly with washing devices of this character having a rather large ratio of diameter to desired horsepower input or intensity of washing liquid spray, somewhat less than optimum efficiency may be noted due to an apparent channeling of the descending air or other gas through discontinuities or less intense areas of the washing liquid spray so that the material to be washed, particularly when introduced into the apparatus at relatively high velocity, does not distribute itself evenly through the spray pattern for the desired increased impact of the spray droplets on entrained material. Attempting to alleviate such condition by increasing the horsepower of the unit, the density of the spray, or the depth of the spray pattern or washing chamber may not be desired for a variety of economic reasons.

According to this invention, however, the accumulation of dry or semi-wet entrained matter around the upper portion of the washing chamber and a diminution of the efficiency because of non-uniform channeling of the material to be washed through the spray pattern are minimized by the interposition in the spray area of the washing chamber of a substantially transversely disposed helical or annular baffle around the walls of the washing chamber whereby a portion of the spray of the washing liquid is deflected upwardly to provide a self-cleaning effect on upper areas of the washing chamber walls and whereby the downwardly flowing stream of air or gas is restricted for part of its travel to more concentrated central areas of the washing spray pattern, while still leaving a larger cross sectional area above the baffle for the entering air to adjust itself for more uniform passage downwardly through the spray pattern.

With the foregoing and other objects in view, this invention will now be more fully described, and other objects and advantages thereof will be apparent from the following description, the accompanying drawings, and the appended claims.

In the drawing:
FIG. 1 is a view in vertical section of apparatus embodying and for practicing this invention;
FIG. 2 is a perspective view showing the helical baffle of FIG. 1;
FIG. 3 is a transverse section along the line 3—3 of FIG. 1, but showing a modification including a helical baffle of asymmetrical shape for use in accordance herewith;
FIG. 4 is a partial view showing a planar annular baffle in position in the washing chamber of the apparatus of FIG. 1; and
FIG. 5 is a perspective view on reduced scale showing the annular baffle of FIG. 4.

Referring to the drawings, in which like characters of reference occur to like parts throughout the several views thereof, there is shown in FIG. 1 as illustrative of this invention a vertical section through the type of gas washing apparatus disclosed and illustrated in said above identified copending application. This gas washing apparatus includes an outer generally cylindrical casing 10, the lower portion of which forms a tank or reservoir 11 for the washing liquid. At the top of the casing 10 is mounted a fan housing 12, carried by flange 13 on the top of the casing 10 and including an outlet duct 14 leading to air outlet 15. Centrally mounted in casing 10 and axially below the normal level 16 of washing liquid in tank portion 11 thereof is a bearing base 20, supported by internal cross brackets 21 in known manner within casing 10, for supporting for rotation the lower end of an axial vertical distributor and impeller shaft 25, the upper end of which is mounted for rotation in bearing 26 supported on internal cross bracket 27.

Vertically mounted through fan housing 12 and above but coaxially aligned with shaft 26 is fan and drive shaft 30, supported for rotation in housing 12 as by top bearing 31 carried thereby and lower bearing 32 carried by internal cross brackets 33. The lower end of drive shaft 30 is in driving engagement with the upper end of impeller and distributor shaft 25 as through flexible coupling 34, and shafts 30 and 25 are suitably driven for rotation as by a motor 40 acting through pulley arrangements 41–42 and belts 43. Also mounted on shaft 30 for driving thereby within fan housing 12 is exhaust fan 50 for receiving air from casing 10, after washing therein, and exhausting it through outlet duct 14 and air outlet 15. At the bottom end of shaft 25 and mounted thereon for rotation therewith is liquid pumping impeller 55, adapted to pump water or other washing liquid from tank 11 and to force it upwardly into the interior of a rotating cage distributor 60, also mounted on shaft 25 for rotation therewith, and including a top plate 61 affixed to shaft 25, from which plate depends a plurality of spaced bars or vanes 62 the lower ends of which engage in ring 63.

As will be apparent from the foregoing, as the drive shaft 25 is rotated (from drive motor 40 acting through drive 41–42 and shaft 30), the impeller 55 pumps or forces washing liquid from tank 11 up inside rotating cage distributor 60, and this washing liquid is then flung outwardly as a pattern of spray droplets into the washing space around distributor 60 by the moving vanes 62 of the rotating cage impinging upon the stream of washing liquid from impeller 55, all in well-understood manner.

Also mounted within casing 10, and positioned around rotating distributor cage 60 therein, is a generally cylindrical internal wash chamber 70 having a closed top 71, but being open at the bottom. This chamber 70 has generally cylindrical side walls 72 terminating at a level approximately adjacent the lower end of distributor cage 60 and spaced inwardly from the side walls of the casing 10. In the upper portion of wash chamber 70 is provided an air inlet duct 75 leading from outside casing 10 into wash chamber 70 and tangentially arranged with respect thereto, as indicated also in FIG. 3 illustrating in more detail a preferred configuration for the inlet 75 including the constricting form thereof for high speed tangential entry of the gas stream to be washed into inner wash chamber 70.

Thus, the upper portion of inner wash chamber 70 provides a tangential air inlet path through the inlet 75 for introducing air into the apparatus and for imparting to the air stream a swirling motion, while walls 72 of chamber 70 define a washing space for containing the liquid spray droplets flung outwardly by rotating cage distributor 60, and the outside of walls 72 define with the outer walls of casing 10 an annular passage around chamber 70 so that air entering tangential inlet 75 will pass downwardly in a swirling pattern through internal wash chamber 70 within walls 72 and through the liquid spray pattern therein, and will then reverse direction, passing under the lower edge of walls 72, and be drawn upwardly through the outer annular passage by the exhaust action of fan 50, substantially as indicated by the various flow arrows in the drawing.

In the upper section of casing 10 and above air inlet 74 and wash chamber 70 there are provided a plurality of baffle members 80 with spaces 81 therebetween, over and among which the air stream is drawn by fan 50, after leaving the bottom of washing chamber 70, with baffles 80 providing, in known manner, for the removal of entrained moisture or droplets from the washed air. The washing liquid spray flung outwardly by rotating cage distributor 60 ultimately impinges on the inside of walls 72 of chamber 70, forming thereover a substantially continuous sheet or curtain of washing liquid which flows down the inside surfaces of walls 72 to return to reservoir 11.

Preferably the speed and pumping capacity of impeller 55 are so correlated that sufficient washing liquid from reservoir 11 is constantly urged by impeller 55 up into distributor cage 60 to maintain such substantially continuous liquid layer or curtain on the inside of wall 72, and particularly, so that the washing liquid drains off the bottom edge of walls 72 in a substantially continuous annular curtain or screen of liquid (indicated by dot-dash lines 85) through which must pass the air upon leaving wash chamber 70 for a final or added washing effect in addition to that obtained while the air traverses the pattern of spray droplets created by distributor cage 60 within wash chamber 70, and with this downwardly flowing curtain of washing liquid 85 cooperates with the abrupt change of direction of the air stream under the bottom edge of walls 72 to assure substantially complete removal therefrom of entrained material, etc., so that little, if any, of such material is left for entrapment along with moisture or droplets of washing liquid on baffles 80 in the upper part of chamber 10.

The added efficiency of gas washing apparatus in accordance herewith attributable to the tangential inlet of gas to be washed and the swirling passage thereof down through the wash liquid spray pattern in wash chamber 70 is even further enhanced, particularly for the removal of very minute particles of micron and sub-micron size, if the tangential inlet 75 is arranged (as indicated in FIG. 3) to impart to the swirling inlet air a circumferential direction whereby the swirling air movement is opposite to the direction of travel of washing liquid droplets flung outwardly by rotating distributor cage 60. That is, the washing liquid spray is ejected from rotating distributor cage 60 in a direction almost tangential to the periphery of the cage. Accordingly, air inlet 75 may be oriented, as in FIG. 3, in which cage distributor 60 is illustrated as rotating in a clockwise direction, so that the tangentially directed swirling incoming air will be moving in a direction opposite to (e.g., counter-clockwise) the direction of movement of spray droplets in the washing liquid spray, thereby increasing the force of impact between spray droplets and entrained pollutants in the air to be washed so as to gain the advantage which increased impact force contributes to the wetting, collecting, and removing of entrained matter.

Also, in accordance herewith, there is mounted within walls 72 of wash chamber 70 an annular, transversely disposed baffle 90 positioned vertically within the area of the fluid spray pattern produced by rotating distributor cage 60. As illustrated in FIGS. 1 and 2, such baffle 90 is preferably of helical configuration and formed of a metal strip of substantially uniform width, with the upper end 91 of baffle 90 being at least about twice as far above the lower edge of walls 72 as is the lower end 92 of helical baffle 90, and angularly oriented within wash chamber 70 with respect to air inlet 75 as indicated in FIGS. 1 and 2. As will be understood from the foregoing, the provision of such a baffle 90 within wash chamber 70 deflects a portion of the spray from distributor cage 60 upwardly to aid in the cleaning or avoidance of deposits or accumulations of entrained material in the upper portion of wash chamber 70 and/or on the top of 71 thereof, while also restricting or constricting or guiding, to some extent, the stream of air flowing downwardly through wash chamber 70 (without substantially interfering with the swirling movement thereof) so that, for at least a part of the passage therethrough, the air stream is centrally concentrated to pass through the more intense and radially inward portions of the washing liquid spray pattern to achieve the desired completeness and uniformity of washing action by the moving washing liquid spray droplets.

The provision of such a baffle may also have the added advantageous effect of providing for velocity changes in the air stream passing downwardly through wash chamber 70 with, particularly, any decrease in the axial throughput velocity of the air beneath baffle 90 aiding in the precipitate downward separation of entrained matter as the air stream reverses direction beneath the lower edge of walls 72. Also, the guiding or concentrating action of the baffle minimizes any tendency for the swirling air to concentrate in any particular segment of the cross section of the rotating spray pattern.

FIGS. 3 and 4 illustrate modifications of such interposed baffle means in accordance herewith inserted in washing chamber 70 to achieve the aforementioned results. As indicated, the baffle 95 of FIG. 3, while also being helically disposed with the end 96 thereof below the end 97, is of non-uniform width, compared with baffle 90 in FIG. 2, and is preferably oriented angularly within wash chamber 70 and with respect to inlet 75 as illustrated in FIG. 3—i.e., with the widest part of baffle 95 angularly adjacent the path of tangentially entering air. In the embodiment illustrated in FIG. 4, the baffle 100 is provided as a planar annular ring, rather than a helical strip, and is oriented at an angle across wash chamber 70 with, as illustrated, the higher edge thereof positioned angularly adjacent the entering path of air as it takes up the circumferential swirling motion imparted thereto by the tangential inlet 75 into wash chamber 70.

Also, the velocity change in the entering air provided by a constriction preferably included in air inlet 75 and indicated at 105, cooperating with the transversely disposed baffles 90, 95, 100, etc., further aids in sharply reducing the formation of a distinct boundary between dry material therein about to pass downwardly for washing action through the spray pattern in wash chamber 70. This is particularly notable when the higher or wider surface of the baffle is angularly oriented within the quadrant of the washing chamber into which the tangentially entering air is injected for concentrating the washing liquid spray most heavily deflected to the highest part of wash chamber into which the tangentially entering air is injected for concentrating the washing liquid spray most heavily deflected to the highest part of wash chamber 70 so as to contact directly entering air near the inlet where the volume of air is greatest and more or less at the same time as there is imparted to the entering air a swirling and downward change of direction and velocity (which might accentuate undesired deposits or accumulations of entrained material in the entering air).

As will be understood from the foregoing, the particular form of baffle 90 or 95 or 100, etc., is preferably positioned and dimensioned so as to achieve sufficient upward deflection of washing spray droplets and concentration of downwardly moving air streams without, also, providing within the apparatus so great an increase in static pressure of the air moving therethrough as to require an undesired increase in the power or capacity of the driving mechanism 40, etc., to achieve the desired throughput of air or other gas being washed. Merely as illustrative of constructions with which satisfactory results have been obtained in accordance herewith, it may be noted that a reduction of as much as 50% of entrained material in the air passing out of outlet 15 was achieved by the interpositioning of a helical baffle such as shown in FIG. 2 (without other change of construction or operation) in apparatus as illustrated in FIG. 1. Such comparative determinations of enhanced efficiency were made with, for example, apparatus having a capacity of 20,000 c.f.m. of air being washed and where the inside diameter of wash chamber 70 was about 68 inches and the radial width of the ring forming baffle 90 was about 14 inches. It was also noted that increasing the radial width of baffle 90 by an additional several inches did not appear significantly to increase the efficiency of removal of entrained material from the air being washed, but did, to some extent, increase the static pressure within the apparatus against which power must be expended to circulate air therethrough for washing action therein.

It was also noted that, although satisfactory results are achieved in accordance herewith with gas washing devices varying widely in size and capacity (e.g., from about 3000 to 30,000 c.f.m.), the enhanced efficiency attributable to the baffle construction hereof is particularly marked in larger size apparatus. Also, whereas the several different embodiments or modifications illustrated as 90, 95, and 100 achieve satisfactory results with regard to the prevention of dirt deposits or accumulations in the upper portion of washing chamber 70, a construction such as baffle 90 give additionally preferred or enhanced results along the above noted lines for minimizing non-uniform passage or contact of the air stream and entrained matter therein through and with the spray pattern of washing liquid droplets within wash chamber 70.

As noted above, the horizontally directed force imparted to the spray pattern by impeller 55 and rotating distributor case 60 is such as to provide impingement of the spray droplets on the inside surface of walls 72 of wash chamber 70 to wash therefrom any accumulations of entrained matter which may deposit thereon. Similarly, those portions of washing liquid droplets deflected upwardly from the rotating spray pattern within washing chamber 70 impinge or collect upon the wall 72 in the upper portions thereof and, as will be understood, upon the upper exposed surfaces of transverse baffle means 90, 95, 100, etc., so as to maintain such surfaces substantially free of accumulated or deposited entrained matter as such collected washing liquid droplets flow downwardly over and off such surfaces while the lower surfaces of the transverse baffle means are, of course, maintained substantially free of accumulated soil by the impingement thereon of washing liquid droplets ejected in the rotating spray pattern by distributor cage 60.

Thus, there is provided, in accordance with the foregoing, an enhanced arrangement for increasing the efficiency and advantages of gas washing apparatus embodying and for practicing this invention, and in a simple and economical manner, providing for advantageous washing results substantially without undesired increase in size or horsepower or complexity of gas washing apparatus of this character for a given throughput of gas to be washed, etc.

In certain applications wherein gaseous contaminants are entrained in the gas stream to be washed, then the swirling movement of the gas stream may be in the same direction as the direction of rotation of the spray-generating means 60. The purpose of this corresponding rotational movement is to increase the time period of exposure of the gaseous contaminant to each droplet of the washing liquid, as is disclosed and claimed in said copending application of Jamison and Umbricht, Serial No. 112,654, so as to increase the absorption of the contaminant gas into the droplets. To accomplish this, in the apparatus as shown in the drawings, the direction of rotation of the spray-generating means 60 is reversed, and the helical configuration of the baffle 90 or 95 is changed so that the baffle pitches upwardly in the direction of rotation of the spray distributor 60.

Conversely, for gas absorption applications everything else can be arranged as is shown in FIGURE 3, except that the inlet duct 75 is brought into the chamber 70 tangentially in the opposite direction, that is, in the direction of the arrow 102.

In this specification there is shown and described a preferred embodiment of this invention and various modifications thereof; but it is to be understood that these are not intended to be exhaustive or limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

We claim:

1. In gas washing apparatus of the character described having a rotating spray pattern of washing liquid droplets for washing entrained matter from a stream of gas passing downwardly through said rotating spray pattern for impact washing and removal of said entrained matter by said washing liquid droplets, the combination which comprises a substantially cylindrical vertically disposed washing chamber surrounding said rotating spray pattern, inlet means for introducing said stream of gas to be washed into said washing chamber, said inlet means being tangentially disposed with respect to said washing chamber and in the upper portion thereof above said rotating spray pattern for imparting to said stream of gases to be washed a swirling motion during said downward passage of said stream of gas through said spray pattern and through said washing chamber, transverse baffle means extending radially into said washing chamber around the inner walls thereof for deflecting upwardly a portion of said washing liquid droplets from said spray pattern to said upper portion of said washing chamber above said spray pattern for removal of portions of said entrained matter there accumulating, said baffle means extending into said washing chamber for only a portion of the transverse extent thereof with the radially inner edges of said baffle means defining a restricted passage centrally of said washing chamber and vertically within said spray pattern for concentrating said swirling stream of gas into central portions of said chamber and said rotating spray pattern during at least a portion of said downward passage of said stream of gas therethrough, and means for separating said stream of gas from said washing liquid droplets and said entrained matter contacted thereby after passage through said washing chamber and said spray pattern and said baffle means.

2. In gas washing apparatus of the character described having a rotating spray pattern of washing liquid droplets for washing entrained matter from a stream of gas passing through said rotating spray pattern for impact washing and removal of said entrained matter by said washing liquid droplets, the combination which comprises a substantially cylindrical washing chamber surrounding said rotating spray pattern, inlet means for introducing said stream of gas to be washed into said washing chamber, said inlet means being in the upper portion of said washing chamber at one side thereof above said rotating spray pattern and disposed tangentially with respect thereto, transverse baffle means extending radially into said washing chamber around the inner walls thereof for deflecting upwardly a portion of said washing liquid droplets from said spray pattern to said upper portion of said washing chamber for removal of portions of said entrained matter there accumulating, said baffle means extending into said washing chamber for only a portion of the transverse extent thereof with the radially inner edges of said baffle means defining a restricted passage centrally of said washing chamber and said spray pattern for concentrating said stream of gas into central portions of said chamber and said rotating spray pattern during at least a portion of said passage of said stream of gas therethrough, and means for separating said stream of gas from said washing liquid droplets and said entrained matter contacted thereby after passage through said washing chamber and said spray pattern and said baffle means, said baffle means being positioned in said washing chamber to intersect more than one transverse plane through said washing chamber.

3. Gas washing apparatus as recited in claim 2 in which said baffle means is disposed within said washing chamber with the highest portion of said baffle means angularly adjacent said gas inlet means.

4. Gas washing apparatus as recited in claim 3 in which said baffle means comprises an annular ring around the inner walls of said washing chamber and disposed therein within a transverse plane slanting thereacross.

5. Gas washing apparatus as recited in claim 4 in which the highest portion of said slanting annular baffle is positioned adjacent said gas inlet means into said washing chamber.

6. Gas washing apparatus as recited in claim 2 in which said baffle means has a helical configuration within said washing chamber.

7. Gas washing apparatus as recited in claim 6 in which the highest portion of said helically configured baffle means is positioned angularly within said washing chamber adjacent said gas inlet means.

8. Gas washing apparatus as recited in claim 6 in which said helical baffle is of non-uniform transverse width.

9. Gas washing apparatus as recited in claim 8 in which said helical baffle of non-uniform width is positioned around the walls of said washing chamber with the widest portion thereof angularly adjacent said gas inlet means.

10. In a method of the character described for washing entrained matter from a stream of gas to be washed by passing said stream of gas through a washing zone confined within a surrounding wall and through a rotating spray pattern of washing liquid droplets therein for impact between said washing liquid droplets and said entrained matter in said stream of gas, the steps which comprise introducing said stream of gas to be washed into said washing zone above said rotating spray pattern therein in a direction generally tangential to said zone and said rotating spray pattern for passage of said stream of gas therethrough, passing said stream of gas through said rotating spray pattern in said washing zone for contact between said washing liquid droplets and said entrained matter in said stream of gas, deflecting a portion of said washing liquid droplets from said spray pattern in portions thereof adjacent said surrounding wall of said washing zone upwardly in said washing zone for removal of accumulations of entrained matter in said zone above said spray pattern, and concentrating said stream of gas passing through said washing zone into an area of restricted flow centrally of said rotating spray pattern for a portion of said passage of said stream of gas through said spray pattern, and separating from said stream of gas said entrained matter washed therefrom and said washing liquid droplets after said passage of said stream of gas through said washing zone and said rotating spray pattern and said restricted flow area therein.

11. In a method of the characted described for washing entrained matter from a stream of gas to be washed by passing said stream of gas through a washing zone confined within a surrounding wall and through a rotating spray pattern of washing liquid droplets therein for impact between said washing liquid droplets and said entrained matter in said stream of gas, the steps which comprise introducing said stream of gas to be washed into said washing zone above said rotating spray pattern therein in a direction generally tangential to said zone and said rotating spray pattern for downward passage of said stream of gas therethrough effecting deposit and accumulation of a portion of said entrained matter from said stream of gas in said washing zone above said rotating spray pattern therein, passing said stream of gas downwardly through said rotating spray pattern in said washing zone for contact between said washing liquid droplets and said entrained matter in said stream of gas, deflecting a portion of said washing liquid droplets from said spray pattern in a direction generally tangential to said zone and said rotating spray pattern upwardly in said washing zone for removal of said accumulations of entrained matter therein above said spray pattern, and concentrating said stream of gas into an area of restricted flow centrally of said rotating spray pattern for a portion of said downward passage of said stream of gas through said spray pattern, and separating from said stream of gas said entrained matter washed therefrom and said washing liquid droplets after said passage of said stream of gas downwardly through said washing zone and said rotating spray pattern and said restricted flow area therein.

References Cited in the file of this patent

UNITED STATES PATENTS

| | | |
|---|---|---|
| 1,952,308 | Bowen | Mar. 27, 1934 |
| 2,585,440 | Collins | Feb. 12, 1952 |
| 2,599,202 | Schimpke | June 3, 1952 |
| 2,685,841 | Schimpke | Aug. 10, 1954 |
| 2,817,415 | Sykes | Dec. 24, 1957 |
| 2,833,417 | Umbricht et al. | May 6, 1958 |

UNITED STATES PATENT OFFICE
CERTIFICATE OF CORRECTION

Patent No. 3,149,935                                          September 22, 1964

Robert M. Jamison et al.

It is hereby certified that error appears in the above numbered patent requiring correction and that the said Letters Patent should read as corrected below.

Column 8, lines 52 and 53, strike out "in a direction generally tangential to said zone and said rotating spray pattern" and insert instead -- in portions thereof adjacent said surrounding wall of said washing zone --.

Signed and sealed this 12th day of January 1965.

(SEAL)
Attest:

ERNEST W. SWIDER                                             EDWARD J. BRENNER
Attesting Officer                                               Commissioner of Patents